(12) United States Patent
Esenwein

(10) Patent No.: US 9,243,674 B2
(45) Date of Patent: Jan. 26, 2016

(54) POWER TOOL BRAKING DEVICE

(75) Inventor: Florian Esenwein, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 13/881,826

(22) PCT Filed: Sep. 22, 2011

(86) PCT No.: PCT/EP2011/066482
§ 371 (c)(1),
(2), (4) Date: Oct. 28, 2013

(87) PCT Pub. No.: WO2012/055647
PCT Pub. Date: May 3, 2012

(65) Prior Publication Data
US 2014/0034434 A1 Feb. 6, 2014

(30) Foreign Application Priority Data
Oct. 29, 2010 (DE) .......................... 10 2010 043 184

(51) Int. Cl.
*B60L 7/28* (2006.01)
*F16D 63/00* (2006.01)
*B23Q 11/00* (2006.01)
*B24B 23/02* (2006.01)
*B24B 55/00* (2006.01)
*B25F 5/00* (2006.01)
*H02K 7/104* (2006.01)
*H02K 7/14* (2006.01)
(Continued)

(52) U.S. Cl.
CPC .......... *F16D 63/002* (2013.01); *B23Q 11/0092* (2013.01); *B24B 23/028* (2013.01); *B24B 55/00* (2013.01); *B25F 5/00* (2013.01); *H02K 7/104* (2013.01); *H02K 7/145* (2013.01); *H02P 3/02* (2013.01); *H02P 3/06* (2013.01)

(58) Field of Classification Search
CPC .............. B60L 7/28; H02K 7/104; H02P 3/04
USPC ........................................................ 188/164
See application file for complete search history.

(56) References Cited

U.S. PATENT DOCUMENTS 3,101,542 A * 8/1963 Fodor ............................. 188/164
3,703,654 A * 11/1972 Karubian ........................ 310/77
5,337,862 A * 8/1994 Kuwahara ..................... 188/158
(Continued)

FOREIGN PATENT DOCUMENTS

CN 1428919 A 7/2003
CN 1476959 A 2/2004
(Continued)

OTHER PUBLICATIONS

Gareth P Hatch, Recent Developments in Permanent Magnet Gear Systems & Machines, Jan. 2010, Presented at the Magnetics 2010 Conference.*
(Continued)

*Primary Examiner* — Thomas J Williams
(74) *Attorney, Agent, or Firm* — Maginot, Moore & Beck LLP

(57) ABSTRACT

A power tool braking device, in particular a hand-held power tool braking device, of a portable power tool has at least one magnetic field braking unit. The power tool braking device comprises at least one mechanical activation unit.

18 Claims, 11 Drawing Sheets

(51) Int. Cl.
*H02P 3/02* (2006.01)
*H02P 3/06* (2006.01)

(56) References Cited

U.S. PATENT DOCUMENTS

| | | | |
|---|---|---|---|
| 5,595,531 A | | 1/1997 | Niemela et al. |
| 6,948,597 B2* | | 9/2005 | Kuwahara ............... 188/164 |
| 2002/0066632 A1* | | 6/2002 | Kristen et al. ............ 192/17 C |

FOREIGN PATENT DOCUMENTS

| DE | 37 22 629 A1 | 1/1989 |
|---|---|---|
| DE | 37 41 536 A1 | 6/1989 |
| DE | 43 44 424 A1 | 6/1995 |
| DE | 44 46 157 A1 | 7/1996 |
| DE | 195 10 291 A1 | 9/1996 |
| DE | 196 36 873 A1 | 3/1998 |
| DE | 199 32 578 A1 | 6/2000 |
| DE | 20 2005 007 459 U1 | 1/2006 |
| EP | 1 323 501 A2 | 7/2003 |
| EP | 1 327 497 A2 | 7/2003 |
| GB | 372 794 | 5/1932 |
| GB | 2 455 528 A | 6/2009 |
| JP | 61-103021 A | 5/1986 |

OTHER PUBLICATIONS

International Search Report corresponding to PCT Application No. PCT/EP2011/066482, mailed May 21, 2012 (German and English language document) (7 pages).

* cited by examiner

POWER TOOL BRAKING DEVICE

This application is a 35 U.S.C. §371 National Stage Application of PCT/EP2011/066482, filed on Sep. 22, 2011, which claims the benefit of priority to Serial No. DE 10 2010 043 184.2, filed on Oct. 29, 2010 in Germany, the disclosures of which are incorporated herein by reference in their entirety.

BACKGROUND

A power tool braking device of a portable power tool having a magnetic field braking unit is already known from DE 199 32 578 B4.

SUMMARY

The disclosure relates to a power tool braking device, in particular a hand-held power tool braking device, of a portable power tool having at least one magnetic field braking unit.

It is proposed for the power tool braking device to comprise at least one mechanical activation unit. Here, a "portable power tool" is to be understood in particular to mean a power tool, in particular a hand-held power tool, which can be transported by an operator without the use of a transport machine. In particular, the portable power tool has a mass that is less than 50 kg, preferably less than 20 kg and particularly preferably less than 10 kg. Here, a "magnetic field braking unit" is to be understood in particular to mean a braking unit, in particular an electromagnetic braking unit, which, by means of the use of a magnetic field, reduces and/or limits at least substantially in a frictionless manner a speed, in particular a rotational speed, of a moving component, in particular of a rotating component, compared to a working speed, in particular in addition to a purely friction-induced reduction and/or limitation as a result of a mounting of the component. Here, "reduce and/or limit substantially in a frictionless manner" is to be understood in particular to mean a braking of a component, which occurs in a manner free from frictional forces apart from mounting-induced frictional forces and/or flow-induced resistance forces. In particular, the component is braked by means of the magnetic field braking unit decoupled from a contact between the component and a friction lining of a braking element. In principle however, it is also conceivable for a friction braking unit coupled to or decoupled from the magnetic field brake to be provided in addition to the at least substantially frictionless magnetic field braking unit. Furthermore, the magnetic field braking unit is formed in particular as a magnetic field braking unit separate from the drive. Here, a "magnetic field braking unit separate from the drive" is to be understood in particular to mean a magnetic field braking unit that, decoupled from a magnetic field of an electric motor unit, brakes a component by means of a magnetic field. A stator and/or a rotor of the electric motor unit are preferably decoupled from the magnetic field of the magnetic field braking unit. The magnetic field braking unit is preferably provided to brake the component in particular in a period of time greater than 0.1 s, preferably greater than 0.5 s and particular preferably smaller than 3 s, starting from a working speed, in particular to brake the component to a speed that is less than 50% of the working speed, preferably less than 20% of the working speed and particularly preferably to brake the component to a speed of 0 m/s.

Here, a "mechanical activation unit" is to be understood in particular to mean a unit that, as a result of a relative movement, initiates a triggering process and/or an activation process, in particular of the magnetic field braking unit, wherein the relative movement is different from a pure switching movement of a switching element for generation of an electrical signal and in particular is formed by a movement of a magnet element and/or by an inertia-induced movement, in particular an inertia-induced movement of a rotating drive element, output element and/or a machining tool. Here, in this context, a "triggering process" is to be understood in particular to mean a mechanical, electrical, magnetic and/or electronic signaling of a state that is provided to initiate an activation process. Here, an "activation process" is to be understood in particular to mean a mechanical, electrical, magnetic and/or electronic activation of the magnetic field braking unit for generation of forces and/or torques to brake a component. In this context, "provided" is to be understood in particular to mean specifically programmed, designed and/or equipped. In a preferred embodiment of the power tool braking device according to the disclosure, the activation unit is provided to initiate the triggering process and the activation process as a result of the relative movement, in particular in a manner that is at least substantially undelayed over time. In this case, the activation unit may be provided, as a result of a relative movement, for example to signal a triggering process and to initiate an activation process of the magnetic field braking unit at least substantially at the same time. An embodiment of the mechanical activation unit with which a switch is actuated by the relative movement as triggering process and an activation process is initiated subsequently to the triggering process by means of an actuator and/or a spring force and/or by means of other actuation elements appearing appropriate to a person skilled in the art, is likewise conceivable. Furthermore, it is likewise conceivable for the activation unit to comprise a sensor unit, which senses the relative movement and consequently initiates a triggering process, wherein the activation process is initiated for example by means of an actuator.

A further embodiment according to the disclosure of the power tool braking device may consist in the fact that the activation unit is mechanically, electrically, magnetically and/or electronically connected to an electromagnet of the magnetic field braking unit, wherein the electromagnet is provided to influence a magnetic field of the magnetic field braking unit in at least one operating mode. The electromagnet may generate a magnetic field that is additional to an existing magnetic field of the magnetic field braking unit. In this case, it is conceivable for the additional magnetic field in one operating mode to at least partly compensate at least magnetic forces of the existing magnetic field of the magnetic field braking unit and/or in a braking mode to at least partly attenuate said magnetic forces, at least compared to a strength of the magnetic force of the magnetic field. The electromagnet of the magnetic field braking unit may advantageously likewise be provided during start-up of an electric motor unit of the portable power tool in an operating mode to enable an additional torque to reach a working rotational speed of the electric motor unit in a short period of time, for example preferably to achieve a boost operation. The magnetic field braking unit can advantageously be reliably triggered and/or activated by means of the embodiment according to the disclosure of the power tool braking device. Furthermore, in a preferred embodiment of the power tool braking device, it is advantageously possible to dispense with electrical components for triggering and/or activating the magnetic field braking unit. The susceptibility to faults of the magnetic field braking unit can thus advantageously be kept low.

Furthermore, it is proposed for the activation unit to change at least one characteristic of a magnetic field of the magnetic field braking unit as a result of a relative movement. Here, a "characteristic of a magnetic field" is to be understood in particular to mean a parameter that defines a magnetic field, such as a magnetic flux, a magnetic field strength, a magnetic resistance, a magnetomotive force, etc. Here, the term "change" is to define in particular an adjustment and/or influence. The relative movement is preferably a relative movement of two components of an output unit, a drive unit and/or of two braking elements of the magnetic field braking unit. The magnetic field braking unit can advantageously be adjusted as a result of the relative movement. Furthermore, the magnetic field braking unit can advantageously be activated as a result of a relative movement of two components mounted so as to be movable relative to one another.

The magnetic field braking unit preferably comprises at least one braking element, which is formed as a permanent magnet. It is also conceivable however for the magnetic field braking unit in an alternative embodiment to comprise a braking element formed as a coil for generation of a magnetic field. The magnetic field braking unit particularly preferably comprises at least two braking elements, which are formed as permanent magnets. The two braking elements formed as permanent magnets are preferably mounted so as to be movable relative to one another, and in particular are mounted so as to be rotatable relative to one another. The permanent magnets are preferably formed from rare-earth magnets, such as neodymium iron boron (NdFeB), samarium cobalt (SmCo), etc. It is also conceivable however to form the permanent magnets from another material appearing appropriate to a person skilled in the art. The permanent magnets are preferably annular. Furthermore, the permanent magnets comprise angular segments preferably arranged along a circumferential direction, said angular segments having alternating polarity along the circumferential direction. A magnetic field braking unit can be achieved in a constructionally simple manner. Furthermore, a magnetic field braking unit independent of a power supply can advantageously be achieved.

It is also proposed for the activation unit to change a pole position of the permanent magnet relative to a further braking element of the magnetic field braking unit, said further braking element being formed as a permanent magnet. Here, the expression "change pole position" is to define in particular a change of a position of poles of the permanent magnet relative to poles of the further permanent magnet. The permanent magnets are preferably rotated relative to one another about an axis, in particular by an angle corresponding to a pole pitch of the permanent magnets. A "pole pitch" is to be understood in particular to mean a division of a path, in particular of a circumference of 360°, of the permanent magnets into pole segments arranged in succession along a direction, in particular the circumferential direction, in particular into angular segments having a polarity, wherein the pole segments have an alternating polarity relative to one another along the direction. The poles are preferably arranged offset from one another along the circumferential direction. In this case, the poles are preferably arranged adjacently. It is also conceivable however for the poles to be arranged at a distance from one another, in particular as considered along the circumferential direction. A change to the magnetic field, which is provided to brake a moving component, can be produced in a constructionally simple manner.

The magnetic field braking unit is advantageously formed as an eddy current brake. Here, an "eddy current brake" is to be understood in particular to mean a brake that uses the eddy current losses of a metal element moved in a magnetic field to brake the element.

To form the magnetic field braking unit as an eddy current brake, an actuator disk formed from an electrically advantageously conductive material, such as copper and/or aluminum, is preferably arranged between the at least two permanent magnets. Here, the term "between" is to be understood in particular to mean a spatial arrangement with which components are arranged in succession at least along one axis and overlap one another at least in part as viewed along the axis. A magnetic field braking unit can advantageously be achieved in a cost-effective manner.

In an alternative embodiment of the power tool braking device according to the disclosure, the magnetic field braking unit is formed as a hysteresis brake. Here, a "hysteresis brake" is to be understood in particular to mean a brake that generates a braking force and/or a braking torque by means of a reversal of the magnetic polarity of an element moving in a magnetic field, in particular of a ferromagnetic element. To form the magnetic field braking unit as a hysteresis brake, a braking element of the magnetic field braking unit formed from a ferromagnetic material is preferably arranged between the at least two permanent magnets. A magnetic field braking unit with a long service life can advantageously be achieved.

It is also proposed for the power tool braking device to comprise at least one drive unit, which comprises at least one drive element, on which at least one braking element of the magnetic field braking unit is arranged. Here, a "drive unit" is to be understood in particular to mean a unit that comprises at least one electric motor unit and that is provided to generate driving forces and/or driving torques by means of an energy conversion, in particular a conversion of electrical energy into mechanical energy. The drive unit is preferably coupled to an output unit in order to transfer the driving forces and/or the driving torques to a machining tool for machining a workpiece. A compact magnetic field braking unit can advantageously be achieved by means of an arrangement of a braking element of the magnetic field braking unit on a drive element of the drive unit.

The drive element, on which the braking element is arranged at least in part, is advantageously formed as an armature shaft. Here, an "armature shaft" is to be understood in particular to mean a shaft, on which at least one magnetizable unit of the electric motor unit and/or a pinion for transferring forces and/or torques is arranged. The braking element is particularly preferably connected in a rotationally engaged manner to the armature shaft. It is also conceivable however for the braking element to be arranged on a shaft that is coupled in a rotationally engaged manner to the armature shaft, in particular by means of a releasable coupling. A high efficiency of the magnetic field braking unit can advantageously be achieved.

The braking element is preferably arranged on a side of the drive unit facing away from a driving side. Here, a "driving side" is to be understood in particular to mean a side of the drive unit that faces an output unit along an axis of rotation of the drive unit, in particular of the armature shaft of the electric motor unit, and/or on which a pinion of the drive unit is arranged, said pinion being engaged with a gearwheel of an output unit. It is also conceivable however for the braking element to be arranged on the driving side of the drive unit. Installation space that is already present can advantageously be utilized. Furthermore, a cooling air flow generated by a fan unit arranged on the driving side can be achieved in order to cool the drive unit, said cooling air flow being decoupled from a development of heat of the magnetic field braking unit.

The power tool braking device advantageously comprises at least one output unit, which comprises at least one output element, on which at least one braking element of the magnetic field braking unit is arranged. Here, an "output unit" is to be understood in particular to mean a unit that can be driven by means of a drive unit and transfers forces and/or torques generated by the drive unit to a machining tool. Installation space can advantageously be saved by means of an arrangement of a braking element of the magnetic field braking unit on an output element of the output unit.

It is also proposed for the output unit to be formed as a bevel gear. Here, a "bevel gear" is to be understood in particular to mean a gear that comprises an output shaft arranged at an angle relative to an input shaft, wherein the axes of rotation of the input shaft and of the output shaft preferably have a common point of intersection. Here, "arranged at an angle" is to be understood in particular to mean an arrangement of one axis relative to a further axis, in particular of two intersecting axes, wherein the two axes enclose an angle deviating from 180°. An axis of rotation of the input shaft and an axis of rotation of the output shaft in an assembled state of the output unit formed as a bevel gear preferably enclose an angle of 90°. Here, an "input shaft" is to be understood in particular to mean a shaft that introduces forces and/or torques into the output unit formed as a bevel gear. In this case, the input shaft can be formed for example as an armature shaft of an electric motor unit of the drive unit, said armature shaft being formed with a pinion. Here, an "output shaft" is to be understood in particular to mean a shaft that transfers forces and/or torques for example to a machining tool connected in a rotationally engaged manner to the output shaft. In particular, "rotationally engaged" is to be understood in particular to mean a connection that transfers a torque and/or a rotational movement at least in a substantially unchanged manner. Here, "transfer in an at least substantially unchanged manner" is to be understood in particular to mean a complete transfer of forces and/or torques from one component to a further component apart from a loss caused by friction and/or tolerances. The magnetic field braking unit can be integrated into the output unit formed as a bevel gear in a constructionally simple manner. Furthermore, a relative movement of an output element for activation of the magnetic field braking unit can advantageously be utilized by means of the mechanical activation unit.

The magnetic field braking unit is preferably arranged along a flux of force, in particular a flux of force starting from an electric motor unit of the drive unit, at least partly behind an input gearwheel of the bevel gear. Here, an "input gearwheel" is to be understood in particular to mean a gearwheel that, when the bevel gear is assembled, is engaged with a gearwheel of the input shaft, in particular with a pinion of the armature shaft. It is also conceivable however for a braking element formed as a permanent magnet to be arranged on a side of a tool receptacle facing a machining tool and for the machining tool to comprise a braking element formed as an eddy current element and/or hysteresis element on a side facing the tool receptacle. A compact magnetic field braking unit, which advantageously can act on an output element in order to advantageously brake a deceleration of a machining tool can be achieved in a constructionally simple manner.

It is also proposed for the magnetic field braking unit to be formed as an assembly module. Here, the expression "assembly module" is to define in particular a design of a unit, with which a plurality of components are preassembled and the unit is built as a whole in an overall system, in particular in a portable power tool. The assembly module preferably has at least one fastening element, which is provided to releasably connect the assembly module to the overall system. The assembly module can advantageously be disassembled from the overall system in particular with less than 10 fastening elements, preferably with less than 8 fastening elements and particularly preferably with less than 5 fastening elements. The fastening elements are particularly preferably formed as screws. It is also conceivable however for the fastening elements to be formed as other elements appearing appropriate to a person skilled in the art, such as quick-action elements, fastening elements that can be actuated without a tool, etc. At least one function of the assembly module, in particular a change of the pole position of the permanent magnet for activation of the magnetic field braking unit, can preferably be ensured in a state disassembled from the overall system. The assembly module can particularly preferably be disassembled by an end user. The assembly module is thus formed as an exchangeable unit, which can be replaced by a further assembly module, for example in the event of a defect of the assembly module or a functional extension and/or function change of the overall system. A broad spectrum of use of the magnetic field braking unit can advantageously be achieved by means of an embodiment of the magnetic field braking unit as an assembly module. Integration into existing portable power tools can also be achieved in a constructionally simple manner. Furthermore, production costs can thus advantageously be kept low.

The disclosure also relates to a portable power tool, in particular a portable hand-held power tool, comprising a power tool braking device according to the disclosure, in particular comprising a hand-held power tool braking device. The portable power tool can be formed in this case as an angle grinder, as a drill, as a hand-held circular saw, as a chisel hammer and/or as a hammer drill, etc. A safety function can advantageously be achieved for an operator of the portable power tool.

BRIEF DESCRIPTION OF THE DRAWINGS

Further advantages will emerge from the following description of the drawings. Exemplary embodiments of the disclosure are illustrated in the drawings. The drawings, the description and the claims contain numerous features in combination. A person skilled in the art will expediently also consider the features individually and combine them to form appropriate further combinations.

In the drawings.

DETAILED DESCRIPTION

Figure 1:
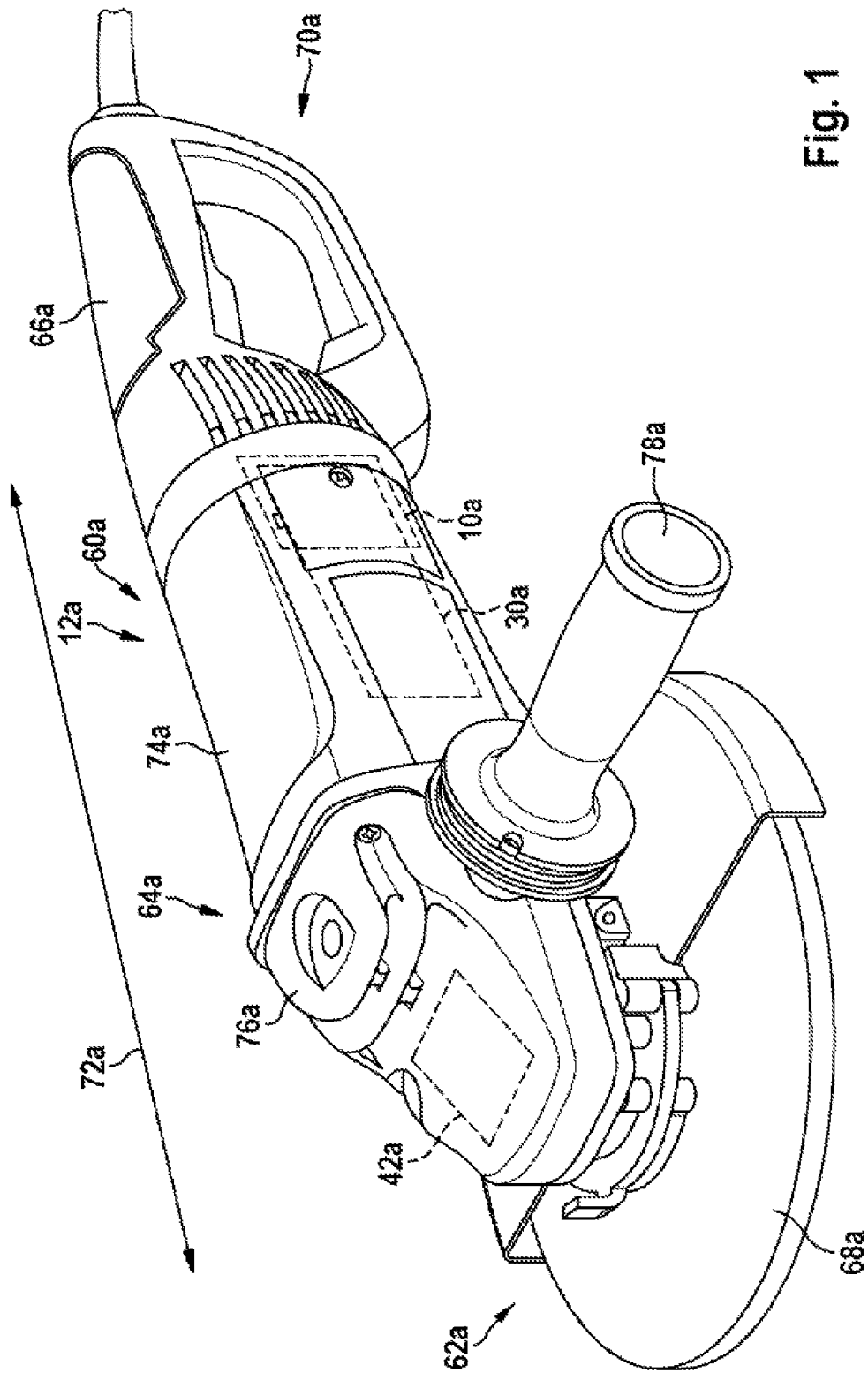
FIG. 1 shows a schematic illustration of a power tool according to the disclosure having a power tool braking device according to the disclosure.

FIG. 1 shows a portable power tool 12a formed as an angle grinder 60a having a power tool braking device 10a. The angle grinder 60a comprises a protective hood unit 62a, a power tool housing 64a and a primary grip 66a, which extends on a side 70a of the power tool housing 64a facing away from a machining tool 68a in the direction of a primary direction of extension 72a of the angle grinder 60a. In this case, the machining tool 68a is formed as a grinding wheel. It is also conceivable however for the machining tool 68a to be formed as an abrasive cutoff wheel or polishing wheel. The power tool housing 64a comprises a motor housing 74a for receiving a drive unit 30a of the power tool braking device 10a and a gear housing 76a for receiving an output unit 42a of the angle grinder 60a. The drive unit 30a is provided to drive the machining tool 68a in a rotating manner via the output unit 42a. An additional grip 78a is arranged on the gear housing 76a. The additional grip 78a extends transversely with respect to the primary direction of extension 72a of the angle grinder 60a.

Figure 2:
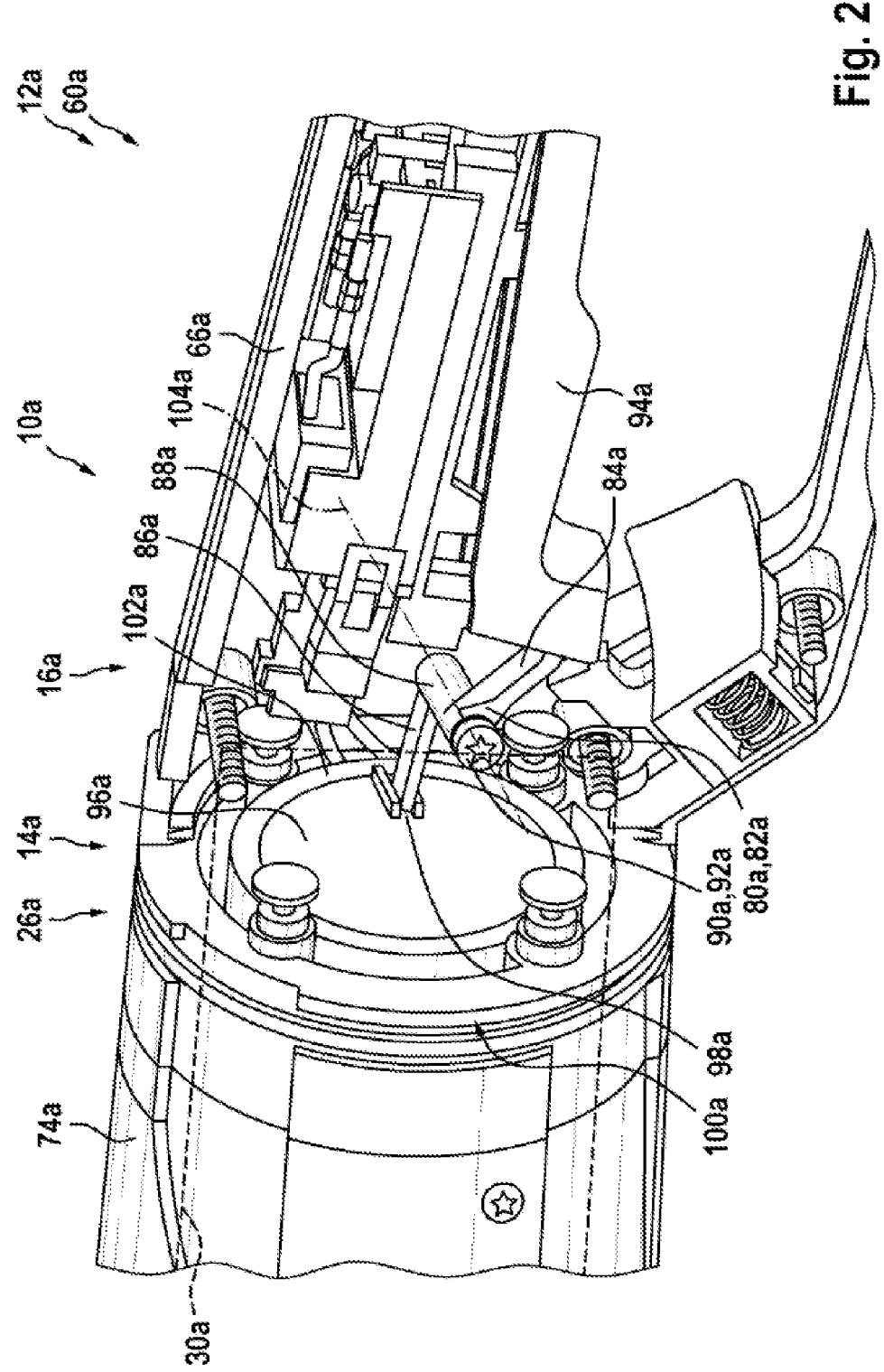
FIG. 2 shows a schematic illustration of a detailed view of an arrangement of the power tool braking device according to the disclosure in the power tool according to the disclosure.

FIG. 2 shows an arrangement of the power tool braking device 10a in the motor housing 74a of the angle grinder 60a. The power tool braking device 10a is arranged in a region of the motor housing 74a facing the main grip 66a. The power tool braking device 10a comprises a magnetic field braking unit 14a and a mechanical activation unit 16a, which is provided to activate the magnetic field braking unit 14a. The magnetic field braking unit 14a is provided to brake the machining tool 68a, which continues to rotate once the angle grinder 60a has been switched off as a result of an inertia of the machining tool 68a. The mechanical activation unit 16a comprises a mechanical sensor element 80a. In this case, the sensor element 80a is formed as a lever element 82a. The lever element 82a has two lever arms 84a, 86a angled with respect to one another. The two lever arms 84a, 86a are rigidly interconnected by means of a mounting element 88a of the lever element 82a. The mounting element 88a is provided to mount the lever element 82a rotatably on an inner face of the motor housing 74a by means of cooperation with a fastening element 92a formed as a screw 90a. The lever element 82a is provided to pick up a movement of an actuation switch 94a of the angle grinder 60a arranged in the main grip 66a and to transfer it to an actuation element 96a of the activation unit 16a. In this case, the lever element 82a is mechanically coupled to the actuation switch 94a of the angle grinder 60a via the lever arm 84a facing the main grip 66a. Furthermore, the lever element 82a is coupled to the actuation element 96a of the activation unit 16a via the lever arm 86a facing away from the main grip 66a. In this case, the lever arm 86a facing away from the main grip 66a engages in a coupling groove 98a of the actuation element 96a. The actuation element 96a is arranged on a housing unit 100a of the magnetic field braking unit 14a. The housing unit 100a comprises a pot-shaped receiving element 102a. The pot-shaped receiving element 102a is formed from an unmagnetizable material, such as aluminum, stainless steel, etc. The actuation element 96a is likewise formed from an unmagnetizable material, such as aluminum, stainless steel, etc. Leakage fluxes of the magnetic field braking unit 14a can thus be kept low. The actuation element 96a is arranged rotatably in the pot-shaped receiving element 102a of the housing unit 100a. Upon actuation of the actuation switch 94a by an operator, the lever element 82a is pivoted about a pivot axis 104a, which is defined by the mounting element 88a and by the screw 90a. In this case, the actuation element 96a is rotated relative to the pot-shaped receiving element 102a by means of the lever element 82a for activation of the magnetic field braking unit 14a in the pot-shaped receiving element 102a.

Figure 3:
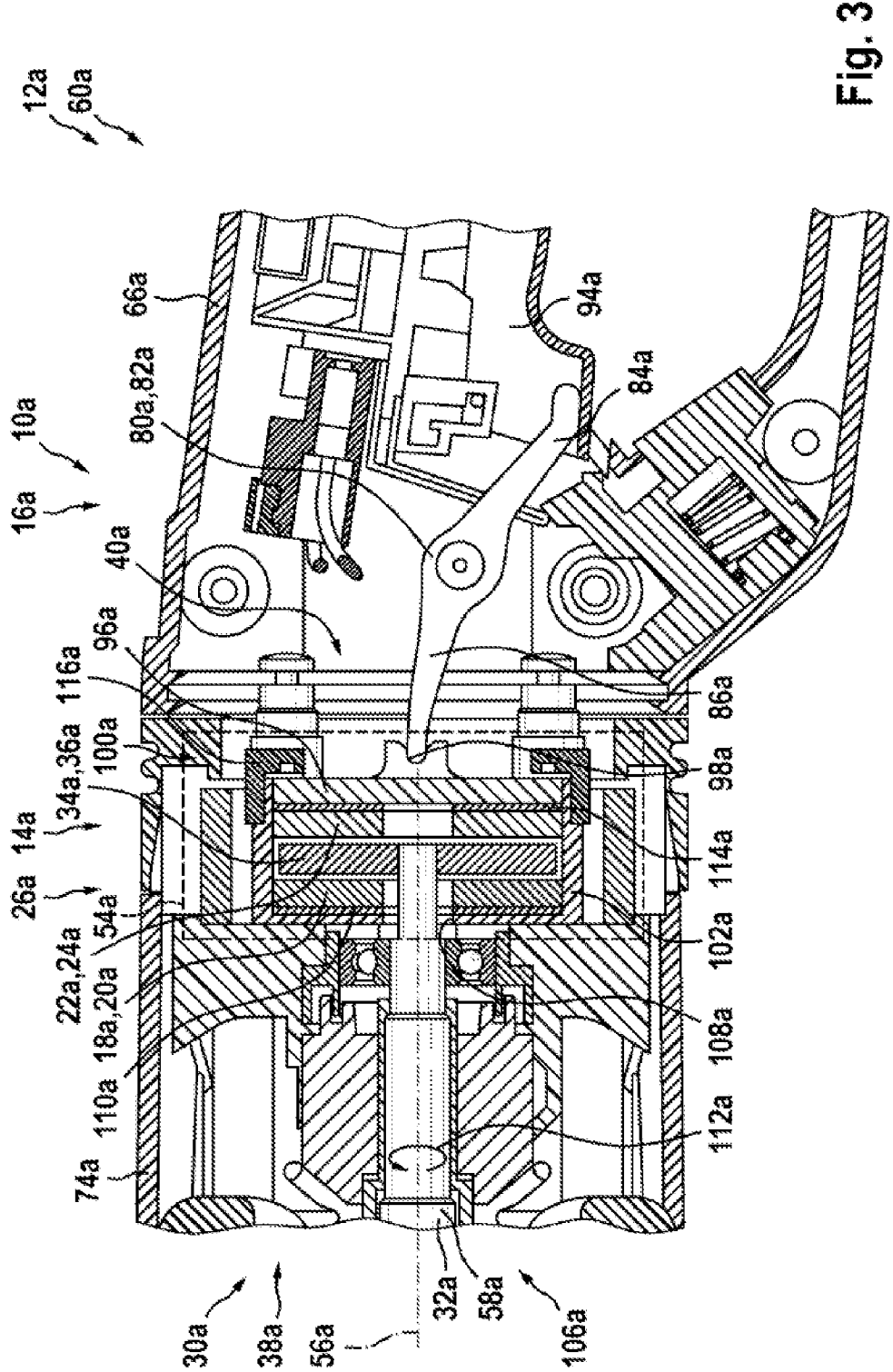
FIG. 3 shows a schematic illustration of a detailed view of the power tool braking device according to the disclosure.

FIG. 3 shows a sectional view of the magnetic field braking unit 14a of the power tool braking device 10a. During assembly, the pot-shaped receiving element 102a of the housing unit 100a is slid over the armature shaft 58a along an axis of rotation 56a of a drive element 32a, formed by an armature shaft 52a, of an electric motor unit 106a of the drive unit 42a via a central opening 108a in the pot-shaped receiving element 102a. Seal elements may be arranged between the central opening 108a and the armature shaft 58a and can prevent an infiltration of dirt in an assembled state. The pot-shaped receiving element 102a of the housing unit 100a is fixed axially in the motor housing 74a by means of holding elements (not illustrated here) so as to be fixed against rotation. An interference element 110a and a braking element 18a of the magnetic field braking unit 14a, said braking element being formed as a first permanent magnet 20a, are arranged in the pot-shaped receiving element 102a. The interference element 110a and the first permanent magnet 20a are connected to one another and to the pot-shaped receiving element 102a in a rotationally engaged manner. The interference element 110a is provided to intensify a magnetic field of the first permanent magnet 20a in the region of the first permanent magnet 20a. The interference element 110a is formed from a ferromagnetic material. It is also conceivable however for the interference element 110a to be formed from another material appearing appropriate to a person skilled in the art. The first permanent magnet 20a is annular. Furthermore, the first permanent magnet 20a comprises angular segments distributed uniformly along a circumferential direction 112a. The angular segments have an alternating polarity relative to one another along the circumferential direction 112a. Furthermore, the magnetic field braking unit 14a comprises a further braking element 34a, which is formed as an eddy current element 36a. The magnetic field braking unit 14a is thus formed as an eddy current brake 26a. It is also conceivable however to form the magnetic field braking unit 14a as another electromagnetic braking unit, such as a hysteresis brake, a powder brake dynamometer, etc. The eddy current element 36a is formed from an electrically conductive material, such as aluminum and/or copper. The eddy current element 36a is also annular. The eddy current element 36a is connected in a rotationally engaged manner to the armature shaft 58a. The braking element 34a formed as an eddy current element 36a is arranged on the armature shaft 58a on a side 40a of the drive unit 30a facing away from a driving side 38a.

Furthermore, the magnetic field braking unit 14a comprises a further braking element 24a formed as a second permanent magnet 22a. The second permanent magnet 22a is annular. The second permanent magnet 22*a* further comprises angular segments distributed uniformly along the circumferential direction 112*a*. The angular segments have an alternating polarity relative to one another along the circumferential direction 112*a*. The magnetic field braking unit 14*a* further comprises a further interference element 114*a*. The further interference element 114*a* is connected in a rotationally engaged manner to the second permanent magnet 22*a*. The second permanent magnet 22*a* and the interference element 114*a* are connected in a rotationally engaged manner to the actuation element 96*a* of the activation unit 16*a*. During assembly, the actuation element 96*a* is slid into the pot-shaped receiving element 102*a* of the housing unit 100*a* along the axis of rotation 56*a* of the armature shaft 58*a* until the actuation element 96*a* bears against a collar (not illustrated here) of the pot-shaped receiving element 102*a*. The collar is provided to ensure an axial play between the second permanent magnet 22*a* and the eddy current element 36*a*, as considered along the axis of rotation 56*a* of the armature shaft 58*a*. To further axially fix the actuation element 96*a* in the pot-shaped receiving element 102*a*, the housing unit 100*a* comprises a closure element 116*a*. During assembly, the closure element 116*a* is screwed onto the pot-shaped receiving element 102*a*. It is also conceivable however for the closure element 116*a* to be connected to the pot-shaped receiving element 102*a* by means of another connection type appearing appropriate to a person skilled in the art, such as by means of pressing, adhesive bonding, etc. Seal elements can be arranged between the actuation element 96*a* and the closure element 116*a* and can prevent an infiltration of dirt. The eddy current element 36*a* is arranged between the first permanent magnet 20*a* and the second permanent magnet 22*a* within the housing unit 100*a* of the magnetic field braking unit 14*a*, as considered along the axis of rotation 56*a* of the armature shaft 58*a*. Furthermore, the eddy current element 36*a* rotates together with the armature shaft 58*a* about the axis of rotation 56*a* of the armature shaft 58*a* relative to the first permanent magnet 20*a* and relative to the second permanent magnet 22*a* during operation of the angle grinder 60*a*. The first permanent magnet 20*a*, the second permanent magnet 22*a* and the eddy current element 36*a* have an axial overlap along the axis of rotation 56*a* of the armature shaft 58*a*. It is also conceivable however for the first permanent magnet 20*a*, the second permanent magnet 22*a* and the eddy current element 36*a* to have a radial overlap, or an axial overlap in combination with a radial overlap.

The magnetic field braking unit 14*a* is in a braking mode in a rest state of the angle grinder 60*a*. In braking mode, oppositely directed polarities of the angular segments of the first permanent magnet 20*a* and of the angular segments of the second permanent magnet 22*a* are arranged opposite one another, as considered along the axis of rotation 56*a* of the armature shaft 58*a*. When starting up the angle grinder 60*a* by means of an actuation of the actuation switch 94*a* in the main grip 66*a* by the operator in order to energize the electric motor unit 106*a*, the lever element 82*a* rotates the actuation element 96*a* relative to the pot-shaped receiving element 102*a*. The second permanent magnet 22*a* is thus rotated relative to the first permanent magnet 20*a*. The magnetic field braking unit 14*a* is thus switched into an operating mode, in which low magnetic forces of the magnetic field braking unit 14*a* act on the eddy current element 36*a*. The activation unit 16*a* is provided to change a characteristic of a magnetic field of the magnetic field braking unit 14*a* as a result of the relative movement. In this case, the activation unit 16*a* changes a pole position of the first permanent magnet 20*a* relative to the second permanent magnet 22*a* of the magnetic field braking unit 14*a* during a transition from a braking mode into an operating mode. In the operating mode, like-directed polarities of the angular segments of the first permanent magnet 20*a* and of the angular segments of the second permanent magnet 22*a* are thus arranged opposite one another, as considered along the axis of rotation 56*a* of the armature shaft 58*a*. If the angle grinder 60*a* is switched off as a result of a discontinuation of an application of force of the operator on the actuation switch 94*a* in the main grip 66*a*, the lever element 82*a* of the actuation 94*a* rotates relative to the pot-shaped receiving element 102*a*. The magnetic field braking unit 14*a* is switched into a braking mode. The two permanent magnets 20*a*, 22*a* are rotated relative to one another. In this case, the second permanent magnet 22*a* is rotated relative to the first permanent magnet 20*a* until oppositely directed polarities of the angular segments of the first permanent magnet 20*a* and of the angular segments of the second permanent magnet 22*a* are arranged opposite one another, as considered along the axis of rotation 56*a* of the armature shaft 58*a*. A voltage is thus induced in the eddy current element 36*a*, which continues to rotate as a result of an inertia after a discontinuation of a driving torque. The induced voltage causes a flow of current in a swirling manner, perpendicularly to a magnetic flux of the magnetic field braking unit 14*a*. In this case, eddy currents are formed. The eddy currents generate a magnetic field in the eddy current element 36*a*, said magnetic field counteracting a magnetic field of the permanent magnets 20*a*, 22*a*. A braking torque is thus generated, which brakes the eddy current element 36*a*. The armature shaft 58*a* is likewise braked as a result of the rotationally engaged connection of the eddy current element 36*a* to the armature shaft 58*a*. The machining tool 68*a* is thus likewise braked by means of the coupling of the drive unit 30*a* and the output unit 42*a*. A strength of the magnetic field of the magnetic field braking unit 14*a* and thus a propagation of a magnetic flux of the magnetic field braking unit 14*a* for generation of the braking torque is dependent on a distance along the axis of rotation 56*a* between the first permanent magnet 20*a* and the second permanent magnet 22*a* and on a pole position along the circumferential direction 112*a* of the first permanent magnet 20*a* and of the second permanent magnet 22*a* relative to one another.

The activation unit 14*a* further comprises an interference element (not illustrated here in greater detail), which is provided, with a discontinuation of an application of force of the operator on the actuation switch 94*a*, to reliably switch the magnetic field braking unit 14*a* into a braking mode. In this case, the interference element can be arranged on the actuation element 96*a* or on the lever element 82*a*. It is also conceivable however for the interference elements to be arranged on the actuation switch 94*a* and to act on the actuation switch 94*a*.

Furthermore, the angle grinder 60*a* comprises a detachment protection unit (not illustrated here in greater detail), which is provided to prevent the machining tool 68*a* fastened by means of a fastening element on a spindle of the angle grinder 60*a* from detaching from the spindle in a braking mode. The detachment protection unit is connected in a rotationally engaged manner to the spindle of the angle grinder 60*a*.

In an alternative embodiment of the power tool braking device, it is conceivable to form the magnetic field braking unit 14*a* as an assembly module 54*a* (merely indicated in a dashed manner). In this case, the first permanent magnet 20*a*, the second permanent magnet 22*a* and the eddy current element 36*a* can be preassembled in the housing unit 100*a*. In this case for example, the eddy current element 36*a* can be arranged rotatably on a shaft in the housing unit 100*a*, which can be connected be means of a coupling and/or an intermediate gear to the armature shaft 58a. Furthermore, it is also conceivable, with an embodiment of the magnetic field braking unit 14a as an assembly module, for the first permanent magnet 20a, the second permanent magnet 22a and the eddy current element 36a to be preassembled in the housing unit 100a and for the actuation element 96a to comprise an assembly recess, which is provided to enable an operator to assemble an eddy current element 36a on the armature shaft 58a. After assembly, the assembly recess can be closed, for example by means of a stopper. Furthermore, it is conceivable for the power tool braking device 10a to comprise a safety unit, which is provided to activate the magnetic field braking unit 14a for example in the event that a tool ruptures or in the event of an interruption of a power supply of the angle grinder 60a, for example as a result of a defective power supply cable. The safety unit can be formed mechanically, electrically and/or electronically in this case. It is also conceivable, in addition to the magnetic field braking unit 14a, for the power tool braking device 10a to have a further magnetic field braking unit, which is arranged in the gear housing 76a. In this case, the power tool braking device 10a could comprise the output unit 42a, which comprises an output element, on which a braking element of the further magnetic field braking unit is arranged. It is also conceivable, in addition to a fan unit of the drive unit 30a, for the power tool braking device 10a to comprise a cooling unit, which is provided to dissipate heat generated by the magnetic field braking unit 14a in the braking mode as a result of an internal friction of the eddy current element 36a.

Alternative exemplary embodiments are illustrated in FIGS. 4 to 12. Unchanged components, features and functions are generally denoted by the same reference sign. In order to distinguish between the exemplary embodiments, the letters a to d have been added to the reference signs of the exemplary embodiments. The following description is limited substantially to the differences from the first exemplary embodiment in FIGS. 1 to 3, wherein reference can be made to the description of the first exemplary embodiment in FIGS. 1 to 3 with regard to unchanged components, features and functions.

Figure 4:
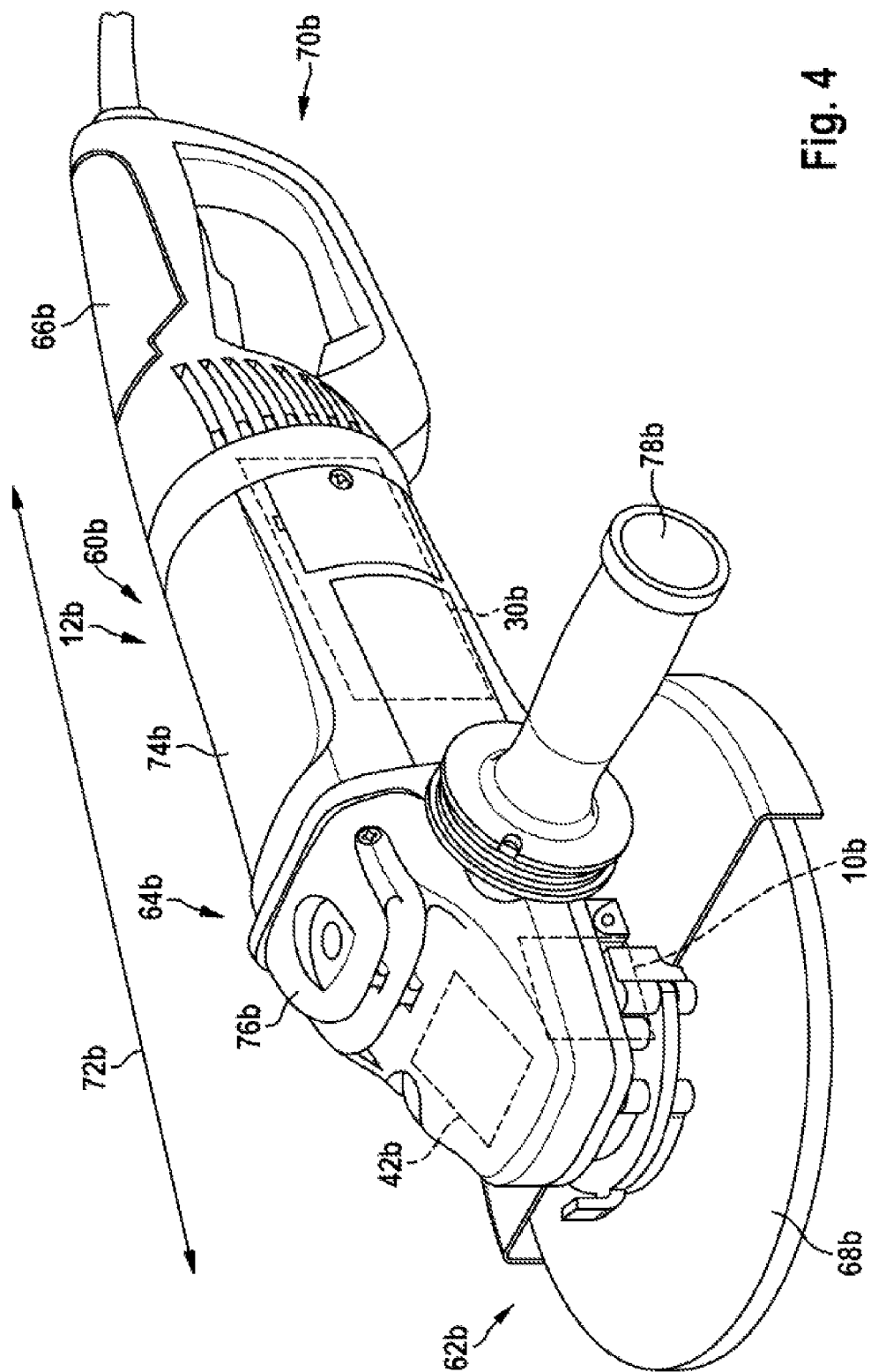
FIG. 4 shows a schematic illustration of a further power tool according to the disclosure with an alternative arrangement of a power tool braking device according to the disclosure.
Figure 5:
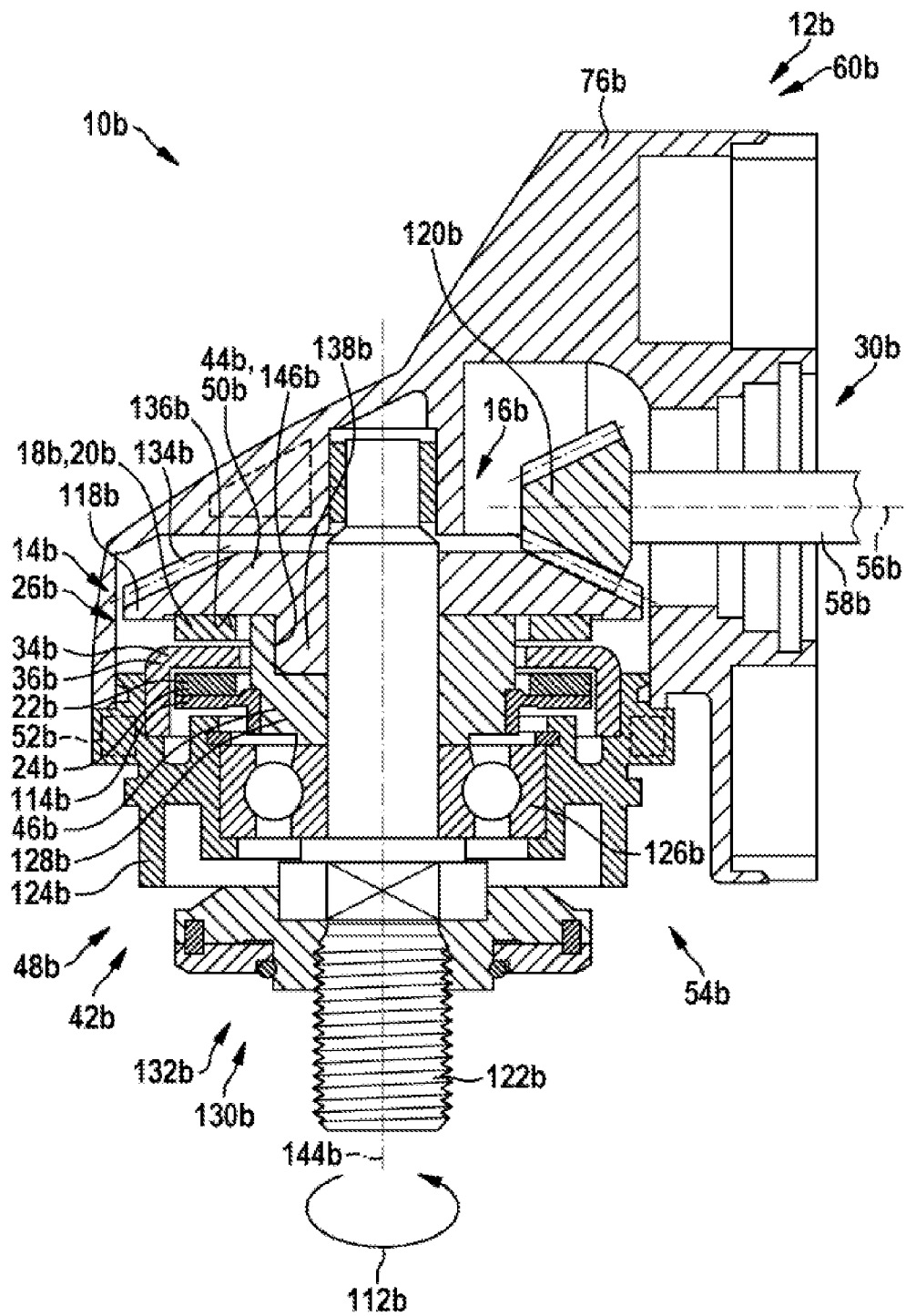
FIG. 5 shows a schematic illustration of a detailed view of the power tool braking device from FIG. 4.

FIG. 4 shows a portable power tool 12b, formed as an angle grinder 60b, having a power tool braking device 10b. The angle grinder 60b has substantially the same structure compared to the angle grinder 60a from FIG. 1. The power tool braking device 10b is arranged in this case in a gear housing 76b of the angle grinder 60b. The power tool braking device 10b also comprises a magnetic field braking unit 14b and a mechanical activation unit 16b (FIG. 5). The activation unit 16b is provided to change a characteristic of a magnetic field of the magnetic field braking unit 14b as a result of a relative movement. Furthermore, the power tool braking device 10b comprises an output unit 42b, which comprises an output element 44b, on which at least one braking element 18b of the magnetic field braking unit 14b is arranged, said braking element being formed as a first permanent magnet 20b. The output unit 42b is formed as a bevel gear 48b, which is coupled to a drive unit 30b of the angle grinder 60b for torque transfer. The magnetic field braking unit 14b is arranged after an input gearwheel 50b of the bevel gear 48b along a flux of force starting from the drive unit 30b. In this case, the output element 44b is formed as a crown gear 118b. The crown gear 118b is engaged with a pinion 120b of the drive unit 30b in an assembled state of the power tool braking device 10b. The input gearwheel 50b is thus formed by the crown gear 118b.

The output unit 42b further comprises a rotatably mounted spindle 122b, a bearing flange 124b, a bearing element 126b arranged in the bearing flange 124b, and an output element 46b, which is coupled in a rotationally engaged manner to the spindle 122b and is formed as an entraining element 128b. The crown gear 118b is arranged on the spindle 122b by means of a clearance fit. The bearing flange 124b is releasably connected to the gear housing 76b by means of fastening elements (not illustrated here in greater detail) of the output unit 42b. Furthermore, a machining tool 68b can be connected in a rotationally engaged manner to the spindle 122b by means of a fastening element (not illustrated here in greater detail) for machining of a workpiece. The machining tool 68b can thus be driven rotatingly during operation of the angle grinder 60b. The power tool braking device 10b further comprises a detachment protection unit 130b, which is provided to prevent detachment of the machining tool 68b and/or of the fastening element from the spindle 122b in a braking mode. The detachment protection unit 130b is formed in this case as a receiving flange 132b, which is connected in a rotationally engaged manner to the spindle 122b by means of an interlocked connection. It is also conceivable however for the receiving flange 132b to be connected in a rotationally engaged manner to the spindle 122b by means of other connection types appearing appropriate to a person skilled in the art.

Figure 6:
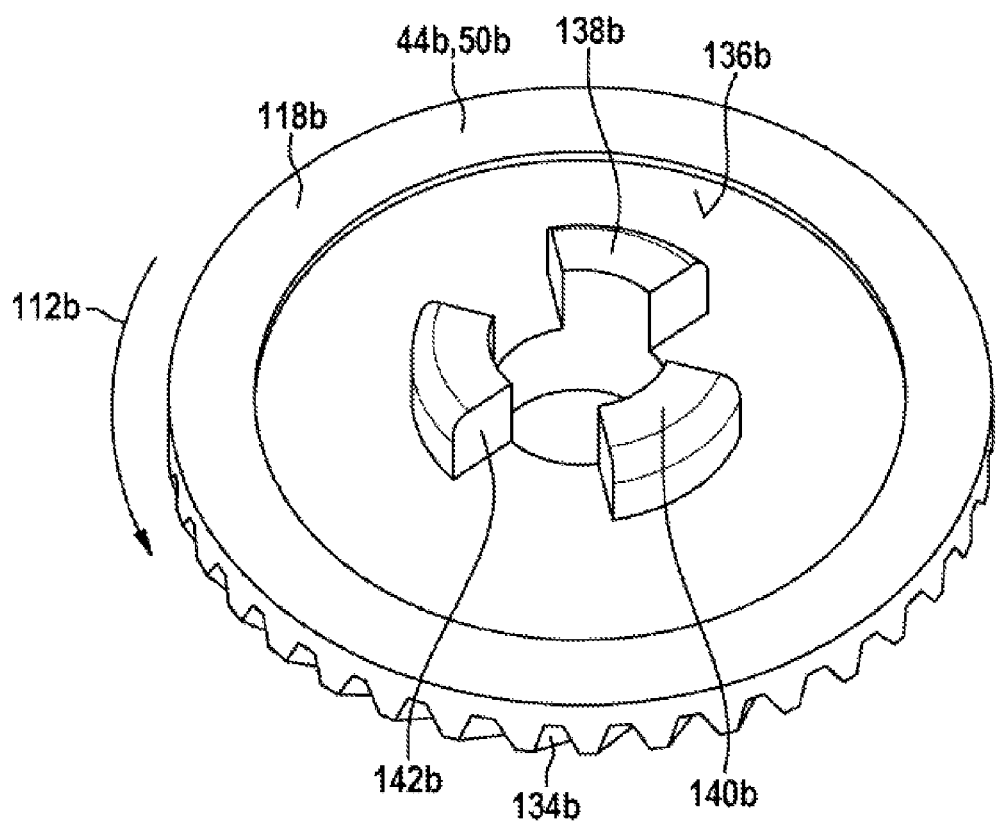
FIG. 6 shows a schematic illustration of a detailed view of an output element of an output unit of a magnetic field braking unit of the power tool braking device from FIG. 5.

FIG. 6 shows a detailed view of the crown gear 118b of the output unit 42b. The crown gear 118b is formed from a magnetically conductive material, for example from a ferromagnetic material. A magnetic field in the region of the crown gear 118b can thus be intensified and leakage fluxes can be kept low. Furthermore, the crown gear 118b comprises three rotation-entraining elements 138b, 140b, 142b on a side 136b of the crown gear 118b facing away from a toothing 134b of the crown gear 118b. It is also conceivable however for the crown gear 118b to comprise a number of rotation-entraining elements 138b, 140b, 142b differing from three. A person skilled in the art will provide a suitable number of rotation-entraining elements 138b, 140b, 142b on the crown gear 118b depending on the field of application. The rotation-entraining elements 138b, 140b, 142b are distributed uniformly along a circumferential direction 112b on the side 136b of the crown gear 118b facing away from the toothing 134b. The circumferential direction 112b extends in this case in a plane running perpendicular to an axis of rotation 144b of the crown gear 118b. The crown gear 118b rotates during operation about the axis of rotation 144b in order to transfer torques onto the machining tool 68b. Furthermore, the rotation-entraining elements 138b, 140b, 142b extend perpendicularly with respect to the side 136b of the crown gear 118b facing away from the toothing 134b. In an assembled state of the output unit 42b, the rotation-entraining elements 138b, 140b, 142b extend in the direction of the entraining element 128b (FIG. 5).

Figure 7:
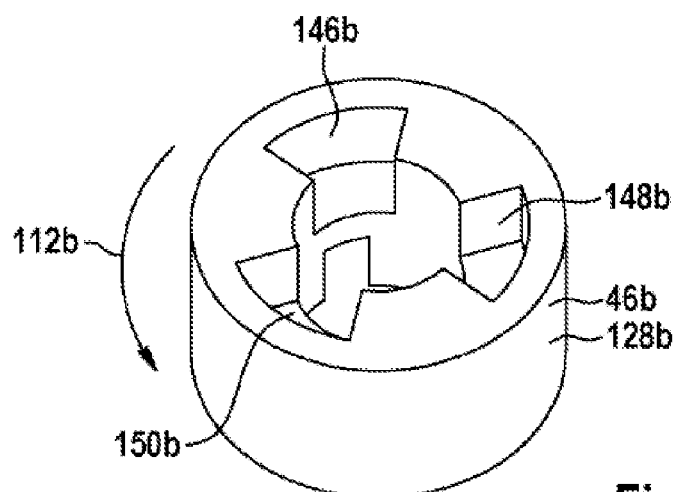
FIG. 7 shows a schematic illustration of a detailed view of a further output element of the output unit of the magnetic field braking unit of the power tool braking device from FIG. 5.

FIG. 7 shows a detailed view of the entraining element 128b. The entraining element 128b comprises rotation-entraining recesses 146b, 148b, 150b in order to receive the rotation-entraining elements 138b, 140b, 142b. In an assembled state, the rotation-entraining elements 138b, 140b, 142b thus extend along the axis of rotation 144b of the crown gear 118b into the rotation-entraining recesses 146b, 148b, 150b. The rotation-entraining recesses 146b, 148b, 150b are arranged on the entraining element 128b, distributed uniformly along the circumferential direction 112b. Furthermore, the rotation-entraining recesses 146b, 148b, 150b along the circumferential direction 112b have a greater extension compared to the rotation-entraining elements 138b, 140b, 142b. A rotational play is achieved between the crown gear 118b and the entraining element 128b along the circumferential direction 112b. The rotational play is formed by an angular range, through which the crown gear 118*b* can be rotated relative to the entraining element 128*b*. In this case, the angular range is formed by a circular circumference of 360°, divided by the number of poles of the permanent magnets 20*b*, 22*b*. The rotation-entraining elements 138*b*, 140*b*, 142*b* can thus be moved along the circumferential direction 112*b* into the rotation-entraining recesses 146*b*, 148*b*, 150*b* relative to edge regions of the rotation-entraining recesses 146*b*, 148*b*, 150*b*. When the rotation-entraining elements 138*b*, 140*b*, 142*b* bear against edge regions of the rotation-entraining recesses 146*b*, 148*b*, 150*b*, the entraining element 128*b* couples the crown gear 118*b* in a rotationally engaged manner to the spindle 122*b*. The relative movement of the crown gear 118*b* relative to the entraining element 128*b* is utilized by the activation unit 16*b* to change a characteristic of a magnetic field of the magnetic field braking unit 14*b*. It is also conceivable however for the rotation-entraining elements 138*b*, 140*b*, 142*b* to be arranged on the entraining element 128*b*, and for the rotation-entraining recesses 146*b*, 148*b*, 150*b* to be arranged on the crown gear 118*b*. The rotation-entraining elements 138*b*, 140*b*, 142*b* of the crown gear 118*b* and the rotation-entraining recesses 146*b*, 148*b*, 150*b* of the entraining elements 128*b* form the mechanical activation unit 16*b*.

Figure 8:
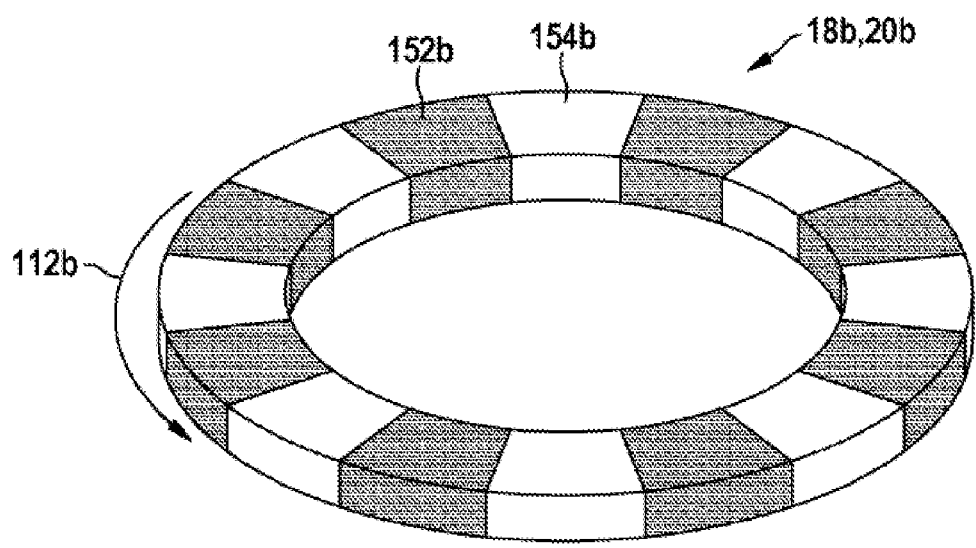
FIG. 8 shows a schematic illustration of a detailed view of a braking element, formed as a permanent magnet, of the magnetic field braking unit of the power tool braking device according to the disclosure.

The first permanent magnet 20*b* connected in a rotationally engaged manner to the crown gear 118*b* is annular (FIG. 8). The first permanent magnet 20*b* is arranged on the side 136*b* of the crown gear 118*b* facing away from the toothing 134*b*. Furthermore, the first permanent magnet 20*b* comprises angular segments 152*b*, 154*b* distributed uniformly along the circumferential direction 112*b*. The angular segments 152*b*, 154*b* have an alternating polarity relative to one another along the circumferential direction 112*b*. The polarities alternate continuously along the circumferential direction 112*b* between magnetic North Pole and magnetic South Pole. The magnetic field braking unit 14*b* comprises a further braking element 24*b* formed as a second permanent magnet 22*b*. The second permanent magnet 22*b* is annular and comprises angular segments (not illustrated here in greater detail) distributed uniformly along the circumferential direction 112*b*. Furthermore, the second permanent magnet 22*b* is arranged in a rotationally engaged manner on the entraining element 128*b* by means of an interference element 114*b*. The interference element 114*b* is provided to intensify a magnetic field of the magnetic field braking unit 14*b* in the region of the magnetic field braking unit 14*b* and to keep leakage fluxes low.

Furthermore, the magnetic field braking unit 14*b* comprises a further braking element 34*b*, which is formed as an eddy current element 36*b*. The magnetic field braking unit 14*b* is thus formed as an eddy current brake 26*b*. The eddy current element 36*b* is formed from an electrically conductive material, such as aluminum and/or copper. The eddy current element 36*b* is also arranged axially between the first permanent magnet 20*b* and the second permanent magnet 22*b* along the axis of rotation 144*b* of the crown gear 118*b*. The eddy current element 36*b* is fixedly connected to the bearing flange 124*b*. The first permanent magnet 20*b* and the second permanent magnet 22*b* are thus moved relative to the eddy current element 36*b* by means of the spindle 122*b* during operation of the angle grinder 60*b*. To avoid a magnetic short circuit, the entraining element 128*b* and the spindle 122*b* are formed from an unmagnetizable material, such as stainless steel, etc. The magnetic field braking unit 14*b* is in a braking mode in a rest state of the angle grinder 60*b*. In the braking mode, oppositely directed polarities of the angular segments 152*b*, 154*b* of the first permanent magnet 20*b* and of the angular segments of the second permanent magnet 22*b* are arranged opposite one another, as considered along the axis of rotation 144*b* of the crown gear 118*b*. When starting up the angle grinder 60*b* by energizing an electric motor unit of the drive unit 30*b*, the crown gear 118*b* is driven by the pinion 120*b*. In this case, the crown gear 118*b* is rotated relative to the entraining element 128*b* about the axis of rotation 144*b* until the rotation-entraining elements 138*b*, 140*b*, 142*b* bear against edge regions of the rotation-entraining recesses 146*b*, 148*b*, 150*b*. The crown gear 118*b* is thus coupled in a rotationally engaged manner to the spindle 122*b*. The spindle 122*b* is consequently driven rotatingly. The machining tool 68*b* fastened to the spindle 122*b* is thus likewise driven rotatingly. During operation of the angle grinder 60*b*, low magnetic forces act on the eddy current element 36*b*. To reduce the magnetic forces, it is also conceivable for the permanent magnets 20*b*, 22*b*, in addition to the rotation relative to one another by means of the activation unit 16*b*, to be moved in translation along the axis of rotation 144*b* relative to one another. In this case, a distance between the permanent magnets 20*b*, 22*b* can be changed. For example, a groove on the spindle 122*b* may be provided, said groove having a mathematically defined incline along the axis of rotation 144*b*. For example, a lifting element could engage in the groove. As a result of a relative movement about the axis of rotation 144*b* of the crown gear 118*b*, the first permanent magnet 20*b* could be moved relative to the second permanent magnet 22*b* in a direction directed away from the entraining element 128*b*.

The first permanent magnet 20*b* is rotated between the crown gear 118*b* and the entraining element 128*b* relative to the second permanent magnet 22*b* as a result of the relative movement. The magnetic field braking unit 14*b* is thus switched into an operating mode, in which low magnetic forces of the magnetic field braking unit 14*b* act on the eddy current element 36*b*. When transferring from a braking mode into an operating mode, the activation unit 16*b* changes a pole position of the first permanent magnet 20*b* relative to the second permanent magnet 22*b* of the magnetic field braking unit 14*b*. In the operating mode, like-directed polarities of the angular segments 152*b*, 154*b* of the first permanent magnet 20*b* and of the angular segments of the second permanent magnet 22*b* are arranged opposite one another, as considered along the axis of rotation 144*b* of the crown gear 118*b*.

When the angle grinder 60*b* is switched off, the pinion 120*b* is braked by the electric motor unit. The machining tool 68*b* fastened on the spindle 122*b* continues to rotate as a result of an inertia. The spindle 122*b* thus likewise continues to be rotated about the axis of rotation 144*b*. Compared to the pinion 120*b*, the machining tool 68*b* has greater moments of inertia. The pinion 120*b* thus brakes the crown gear 118*b*. The crown gear 118*b* is rotated relative to the entraining element 128*b* about the axis of rotation 144*b* until the rotation-entraining elements 138*b*, 140*b*, 142*b* bear against edge regions of the rotation-entraining recesses 146*b*, 148*b*, 150*b*. In this case, the magnetic field braking unit 14*b* is switched into a braking mode. The two permanent magnets 20*b*, 22*b* are rotated relative to one another. In this case, the first permanent magnet 20*b* is rotated relative to the second permanent magnet 22*b* until oppositely directed polarities of the angular segments 152*b*, 154*b* of the first permanent magnet 20*b* and of the angular segments of the second permanent magnet 22*b* are arranged opposite one another, as considered along the axis of rotation 144*b* of the crown gear 118*b*. A voltage is thus induced in the eddy current element 36*b*. The induced voltage causes a flow of current in a swirling manner, perpendicularly to a magnetic flux of the magnetic field braking unit 14*b*. In this case, eddy currents are formed. The eddy currents generate a magnetic field in the eddy current element 36b, said magnetic field counteracting a magnetic field of the permanent magnets 20b, 22b. A braking torque is thus generated, which brakes the permanent magnets 20b, 22b rotating with the spindle 122b relative to the eddy current element 36b. The spindle 122b and the machining tool 68b are thus likewise braked. A strength of the magnetic field of the magnetic field braking unit 14b and therefore a propagation of a magnetic flux of the magnetic field braking unit 14b for generation of the braking torque is dependent on a distance along the axis of rotation 144b between the first permanent magnet 20b and the second permanent magnet 22b and a pole position along the circumferential direction 112b of the first permanent magnet 20b and of the second permanent magnet 22b relative to one another.

Figure 9:
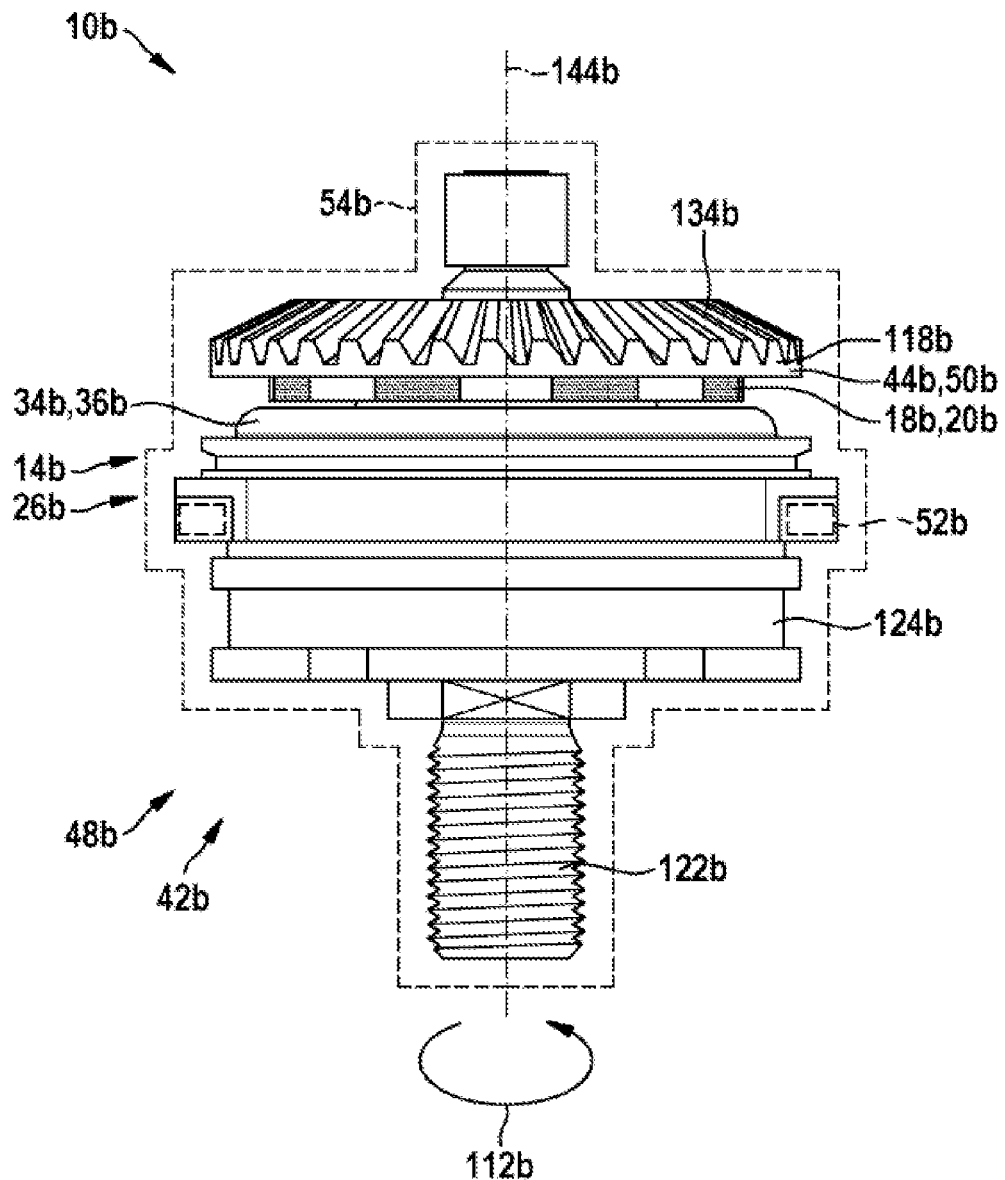
FIG. 9 shows a schematic illustration of a detailed view of the magnetic field braking unit formed as an assembly module for assembly on the power tool from FIG. 4.
Figure 10:
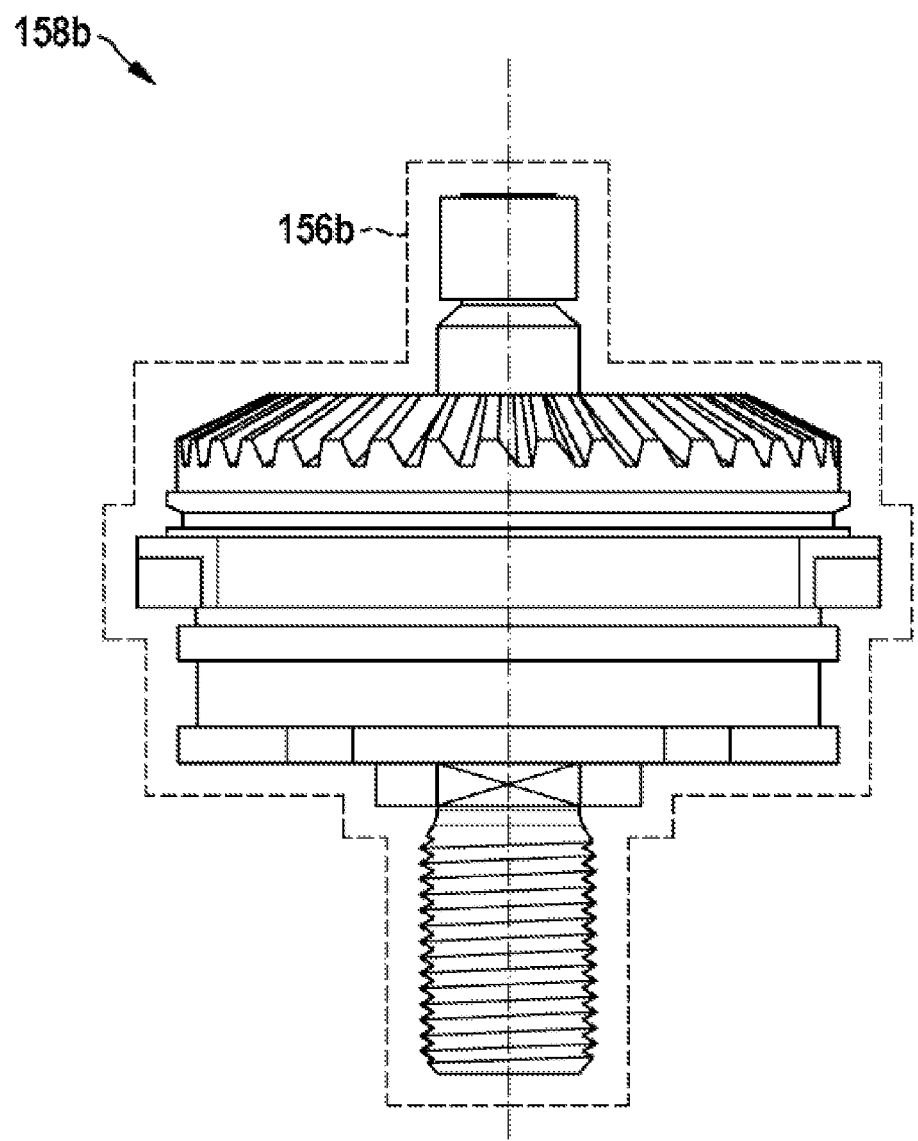
FIG. 10 shows a schematic illustration of a detailed view of an additional assembly module for alternative assembly on the power tool from FIG. 4.

Furthermore, the magnetic field braking unit 14b is formed together with the activation unit 16b and the output unit 42b as an assembly module 54b (FIG. 9). The assembly module 54b thus forms the power tool braking device 10b. The assembly module 54b comprises four fastening elements (not illustrated here) formed as screws. The screws are provided to releasably connect the assembly module 54b to the transmission housing 76b. An operator can disassemble the assembly module 54b from the gear housing 76b as required. The angle grinder 60b and the power tool braking device 10b thus form a power tool system. The power tool system comprises a further assembly module 156b (FIG. 10). The further assembly module 156b comprises an output unit 158b formed as a bevel gear. The further assembly module 156b can be assembled by the operator on the gear housing 76b alternatively to the assembly module 54b. An operator thus has the option of equipping the angle grinder 60b with an assembly module 54b having a magnetic field braking unit 14b, an activation unit 16b and an output unit 42b, or with an assembly module 156b having an output unit 158b. For an application in which the angle grinder 60b is to be operated in a manner decoupled from the power tool braking device 10b, the assembly module 54b can be replaced by an operator by the further assembly module 158b of the power tool system. To this end, the operator merely disassembles the assembly module 54b from the gear housing 76b and assembles the further assembly module 158b on the gear housing 76b.

In an alternative embodiment of the power tool braking device 10b, it is conceivable for the power tool braking device 10b, in addition to the magnetic field braking unit 14b, to have a further magnetic field braking unit, which is arranged in a motor housing 74b of the angle grinder 60b. In this case, the power tool braking device 10b could comprise the drive unit 30b, which comprises a drive element, on which a braking element of the further magnetic field braking unit is arranged. It is also conceivable for the power tool braking device 10b to comprise a cooling unit, which is provided to dissipate heat generated by the magnetic field braking unit 10b in the braking mode as a result of an internal friction of the eddy current element 36b. It is also conceivable for the magnetic field braking unit 10b to comprise an electromagnet 52b (illustrated here in a dashed manner). The electromagnet 52b may be provided, during a start-up of the drive unit 30b, to enable an additional torque in order to reach a working rotational speed of the electric motor unit within a short period of time, for example preferably to achieve a boost operation. It is also conceivable however for the electromagnet 52b to be provided to amplify a magnetic field of the permanent magnet 20b, 22b. A strong braking torque for braking the eddy current element 36b can thus be achieved. In this case, the electromagnet 52b can be coupled for example to a safety unit (not illustrated here), which activates the electromagnet 52b for example if a machining tool 68b ruptures, in order to prevent continued rotation of a spindle of the angle grinder 60b or to brake said spindle.

Figure 11:
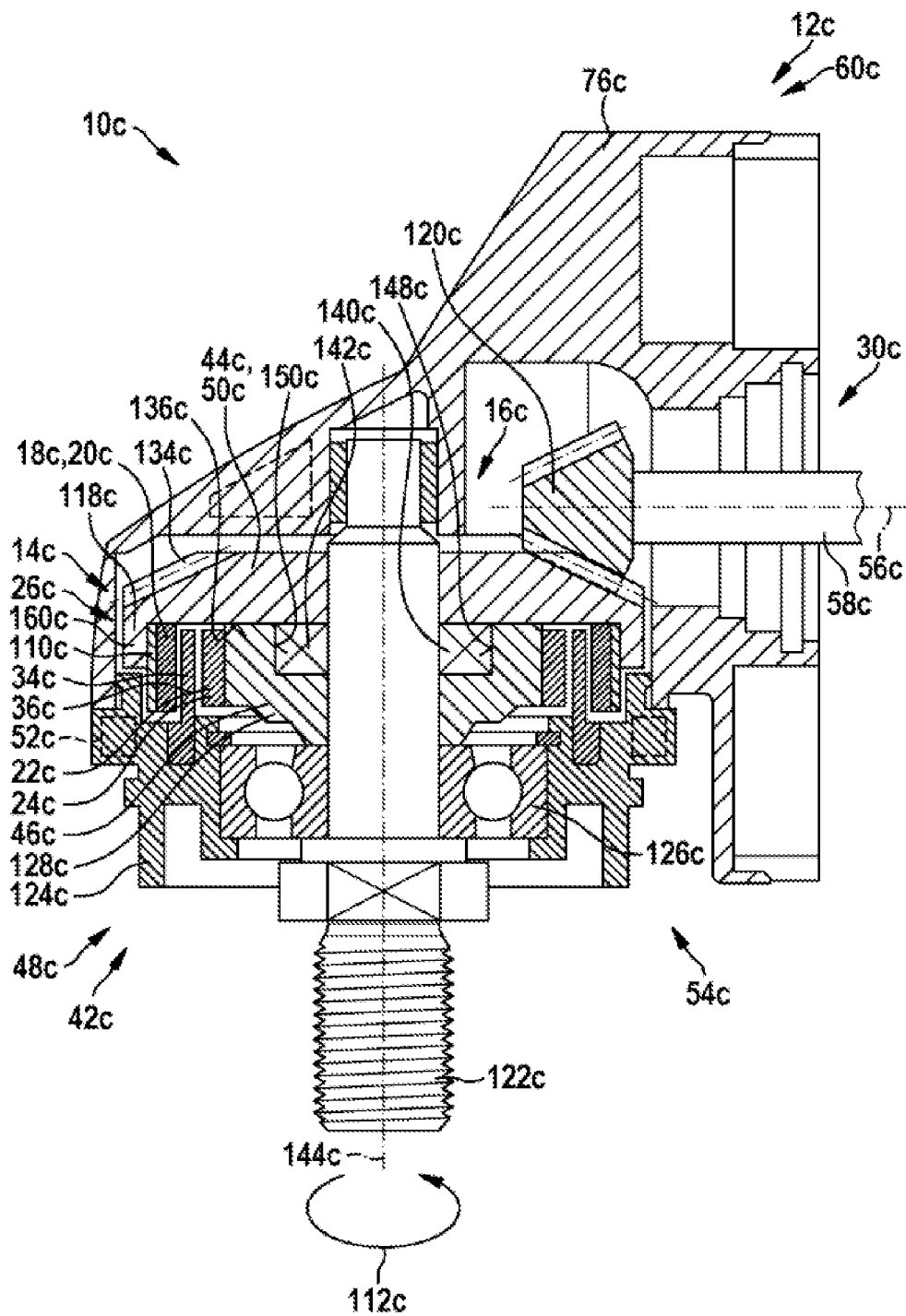
FIG. 11 shows a schematic illustration of a detailed view of an alternative embodiment of a power tool braking device according to the disclosure.

FIG. 11 shows an alternative power tool braking device 10c arranged in a gear housing 76c of an angle grinder 60c. The power tool braking device 10c comprises a magnetic field braking unit 14c, which is formed as an eddy current brake 26c. The power tool braking device 10c further comprises a mechanical activation unit 16c. The mechanical activation unit 16c has a structure similar to the mechanical activation unit 16b from FIG. 5. The activation unit 16c is provided to change a characteristic of a magnetic field of the magnetic field braking unit 14c as a result of a relative movement. The magnetic field braking unit 14c comprises a braking element 18c, which is formed as a first permanent magnet 20c and is connected in a rotationally engaged manner to an output element 44c of an output unit 42c of the power tool braking device 10c, said output element being formed as a crown gear 118c. The magnetic field braking unit 14c also comprises a braking element 24c, which is formed as a second permanent magnet 22c and is connected in a rotationally engaged manner to an output element 46c of the output unit 42c, said output element being formed as an entraining element 128c. The entraining element 128c is formed from a magnetically conductive material, such as a ferromagnetic material. A magnetic field of the second permanent magnet 22c can thus be intensified in the region of the second permanent magnet 22c and leakage fluxes can be kept low.

The permanent magnets 20c, 22c are tubular. In this case, the first permanent magnet 20c is arranged on a collar 160c of the crown gear 118c by means of an interference element 110c. The collar 160c is arranged along a circumferential direction 112c along a total circumference of the crown gear 118c. The circumferential direction 112c runs in a plane running perpendicularly with respect to an axis of rotation 144c of the crown gear 118c. The collar 160c also extends perpendicularly with respect to a side 136c facing away from a toothing 134c in a direction directed away from the toothing. The second permanent magnet 22c is arranged on an outer circumference of the entraining element 128c extending along the circumferential direction 112c. The permanent magnets 20c, 22c are thus arranged at a distance from one another radially along a direction perpendicular with respect to the axis of rotation 144c. The magnetic field braking unit 14c further comprises a further braking element 34c formed as an eddy current element 36c. The eddy current element 36c is arranged between the permanent magnets 20c, 22c along the direction perpendicular with respect to the axis of rotation 144c. Furthermore, the eddy current element 36c is formed from an electrically conductive material, such as aluminum and/or copper. The activation unit 16c changes a pole position of the first permanent magnet 20c relative to the second permanent magnet 22c. With regard to a function of the activation unit 16c and a function of the magnetic field braking unit 14c formed as an eddy current brake 26c, reference can be made to the description of FIGS. 4 to 7.

Furthermore, the magnetic field braking unit 14c is formed together with the activation unit 16c and the output unit 42c as an assembly module 54c. The assembly module 54c thus forms the power tool braking device 10c.

Figure 12:
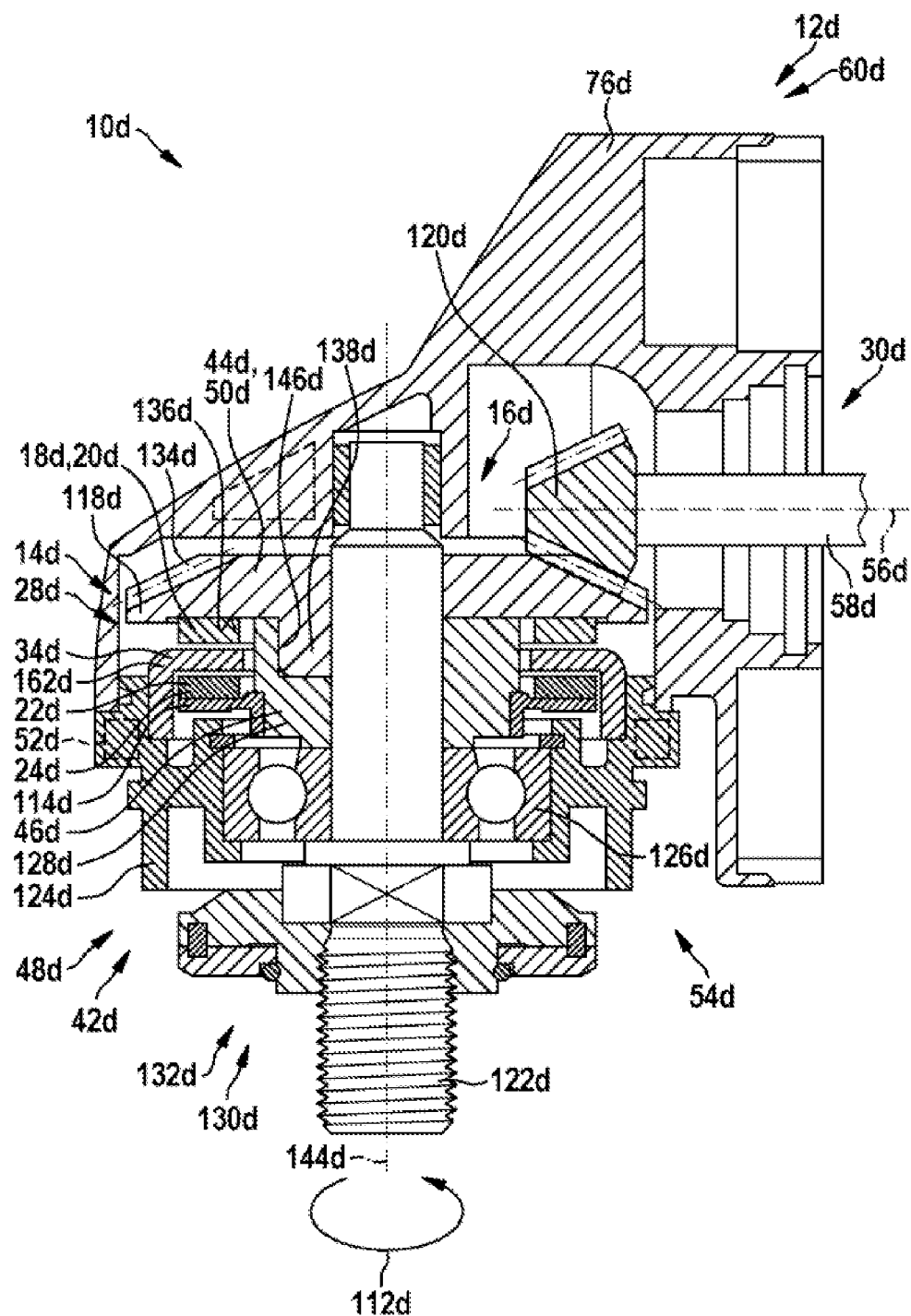
FIG. 12 shows a schematic illustration of a detailed view of a further alternative embodiment of a power tool braking device according to the disclosure.

FIG. 12 shows a further alternative power tool braking device 10d arranged in a gear housing 76d of an angle grinder 60d. The power tool braking device 10d comprises a magnetic field braking unit 14d, which is formed as a hysteresis brake 28d. Furthermore, the power tool braking device 10d comprises a mechanical activation unit 16d. The mechanical activation unit 16d has a structure similar to the mechanical activation unit 16b from FIG. 5. The activation unit 16d is provided to change a characteristic of a magnetic field of the magnetic field braking unit 14d as a result of a relative movement. The magnetic field braking unit 14d also has a substantially similar structure compared to the structure of the magnetic field braking unit 14b from FIG. 5. The magnetic field braking unit 14d comprises a braking element 18d, which is formed as a first permanent magnet 20d and is connected in a rotationally engaged manner to an output element 44d of an output unit 42d of the power tool braking device 10d, said output element being formed as a crown gear 118d. Furthermore, the magnetic field braking unit 14d comprises a braking element 24d, which is formed as a second permanent magnet 22d and is connected in a rotationally engaged manner to an output element 46d of the output unit 42d, said output element being formed as an entraining element 128d. Furthermore, the magnetic field braking unit 14d comprises a further braking element 34d formed as a hysteresis element 162d. The hysteresis element 162d is arranged axially between the first permanent magnet 20d and the second permanent magnet 22d along an axis of rotation 144d of the crown gear 118d. It is also conceivable however for the hysteresis element 162d to be arranged between the 20d, 22d along a direction perpendicular to the axis of rotation 144d (see FIG. 11).

In a braking mode of the magnetic field braking unit 14d, like-directed polarities of angular segments of the first permanent magnet 20d and of angular segments of the second permanent magnet 22d are arranged opposite on another, as considered along the axis of rotation 144d of the crown gear 118d. In this case, a magnetic field of the permanent magnets 20d, 22d acts on the hysteresis element 162d. A line of flux is thus generated along a circumferential direction 112d in the hysteresis element 162d. The line of flux generates a torque, which counteracts a rotational movement of the permanent magnets 20d, 22d rotating with a spindle 122d of the output unit 42d. The permanent magnets 20d, 22d are thus braked. The torque for braking the permanent magnets 20d, 22d generates a retaining force acting on the permanent magnets 20d, 22d when the permanent magnets 20d, 22d come to a standstill. The magnetic field braking unit 14d formed as a hysteresis brake 28d can thus be used as a holding brake. In one operating mode, oppositely directed polarities of the angular segments of the first permanent magnet 20d and of the angular segments of the second permanent magnet 22d are arranged opposite one another, as considered along the axis of rotation 144d of the crown gear 118d. Low magnetic forces of a magnetic field of the permanent magnets 20d, 22d act on the hysteresis element 162d. In this case, a line of flux runs perpendicularly along the axis of rotation 144d and through the hysteresis element 162d.

Furthermore, the magnetic field braking unit 14d together with the activation unit 16d and the output unit 42d is formed as an assembly module 54d. The assembly module 54d thus forms the power tool braking device 10d.

The invention claimed is:

1. A power tool braking device of a portable power tool, comprising:
at least one magnetic field braking unit including a first braking element, a second braking element and a third braking element, the first braking element being moveable with respect to the second braking element; and
at least one mechanical activation unit positioned on a side of the at least one magnetic field braking unit opposite at least one drive unit of the portable power tool and including a mechanical actuation switch configured to move a lever arm in engagement with the first braking element to move the first braking element with respect to the second braking element between relative positions to selectively change a characteristic of a magnetic field generated between the first braking element and the second braking element to selectively brake the third braking element.

2. The power tool braking device as claimed in claim 1, wherein the at least one of the first braking element and the second braking element comprises a permanent magnet.

3. The power tool braking device as claimed in claim 1, wherein:
the first braking element comprises a first permanent magnet;
the second braking element comprises a second permanent magnet; and
the at least one mechanical activation unit is configured to change a pole position of the first permanent magnet relative to second permanent magnet.

4. The power tool braking device as claimed in claim 1, wherein the at least one magnetic field braking unit includes an eddy current brake.

5. The power tool braking device as claimed in claim 1, wherein the at least one magnetic field braking unit includes a hysteresis brake.

6. The power tool braking device as claimed in claim 1, further comprising:
the at least one drive unit including at least one drive element on which at least one of the first braking element, the second braking element, and the third braking element is supported.

7. The power tool braking device as claimed in claim 6, wherein the at least one drive element is configured as an armature shaft.

8. The power tool braking device at least as claimed in claim 6,
wherein the at least one braking element is supported on a side of the at least one drive unit facing away from a driving side.

9. The power tool braking device as claimed in claim 1, wherein the at least one magnetic field braking unit includes an assembly module.

10. A portable power tool comprising:
a drive unit; and
a power tool braking device including; (i) at least one magnetic field braking unit including a first braking element, a second braking element and a third braking element operably coupled to the drive unit, the first braking element being moveable with respect to the second braking element; and (ii) at least one mechanical activation unit positioned on a side of the at least one magnetic field braking unit opposite the drive unit and including a mechanical actuation switch configured to move a lever arm in engagement with the first braking element to move the first braking element with respect to the second braking element between relative positions to selectively change a characteristic of a magnetic field generated between the first braking element and the second braking element to selectively brake the third braking element.

11. A power tool braking device of a portable power tool, comprising:
at least one magnetic field braking unit including a first braking element, a second braking element and a third braking element, the first braking element being rotatable with respect to the second braking element; and
at least one mechanical activation unit including: (i) a first output element rotationally coupled to the first braking element and defining an edge region; and (ii) a second output element rotationally coupled to the second braking element and defining a corresponding edge region configured to selectively engage the edge region of the first output element, wherein the first output element is configured to rotate the second output element with the edge region of the first output element in engagement with the edge region of the second output element; and wherein the first output element is further configured to rotate relative to the second output element with the edge region of the first output element out of engagement with the edge region of the second output element to rotate the first braking element relative to the second braking element between relative positions to change a characteristic of a magnetic field generated between the first braking element and the second braking element to selectively brake the third braking element.

12. The power tool braking device as claimed in claim 11, wherein at least one the first output element and the second output element comprises a bevel gear.

13. The power tool braking device as claimed in claim 12, wherein the at least one magnetic field braking unit is positioned at least in part after an input gearwheel of the bevel gear along a flux of force.

14. The power tool braking device as claimed in claim 11, wherein the at least one of the first braking element and the second braking element comprises a permanent magnet.

15. The power tool braking device as claimed in claim 11, wherein:
the first braking element comprises a first permanent magnet;
the second braking element comprises a second permanent magnet; and
the at least one mechanical activation unit is configured to change a pole position of the first permanent magnet relative to the second permanent magnet.

16. The power tool braking device as claimed in claim 11, wherein the at least one magnetic field braking unit includes an eddy current brake.

17. The power tool braking device as claimed in claim 11, wherein the at least one magnetic field braking unit includes a hysteresis brake.

18. The power tool braking device at least as claimed in claim 11, wherein the at least one braking element is supported on a side of the at least one drive unit facing away from a driving side.

* * * * *